Figure 1:
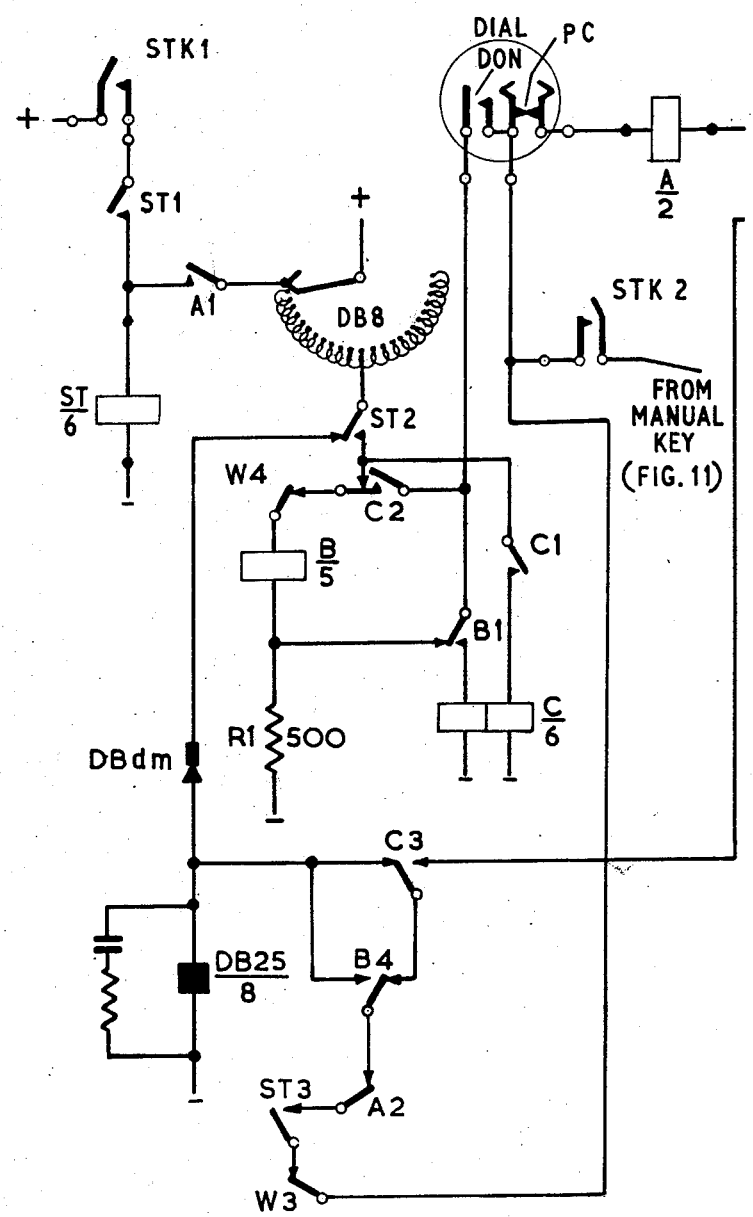

June 29, 1965     H. R. FERNBACH     3,191,410
MACHINE TOOL CONTROL
Filed June 8, 1961     21 Sheets-Sheet 8

INVENTOR
HANS RAINER FERNBACH
BY
ATTORNEYS

June 29, 1965  H. R. FERNBACH  3,191,410
MACHINE TOOL CONTROL
Filed June 8, 1961  21 Sheets-Sheet 11

INVENTOR
HANS RAINER FERNBACH
BY
ATTORNEYS

June 29, 1965  H. R. FERNBACH  3,191,410
MACHINE TOOL CONTROL
Filed June 8, 1961  21 Sheets-Sheet 12

INVENTOR
HANS RAINER FERNBACH
BY
ATTORNEYS

June 29, 1965     H. R. FERNBACH     3,191,410
MACHINE TOOL CONTROL
Filed June 8, 1961     21 Sheets-Sheet 16
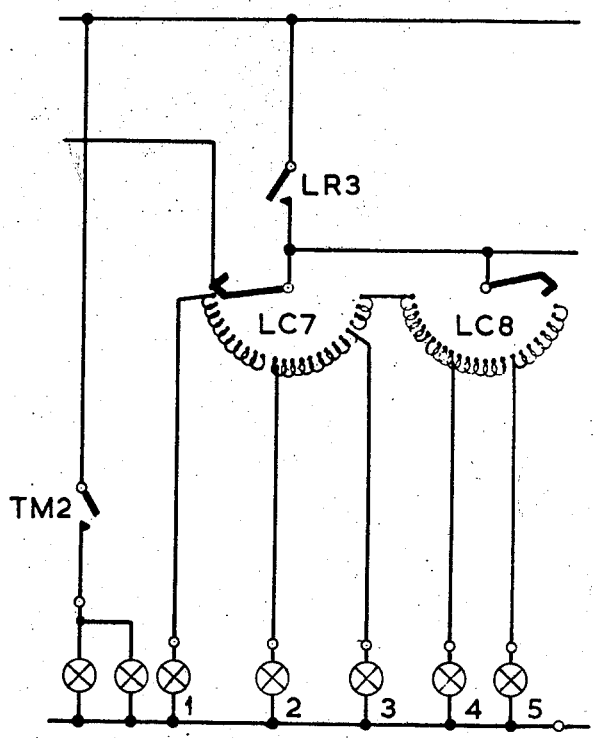
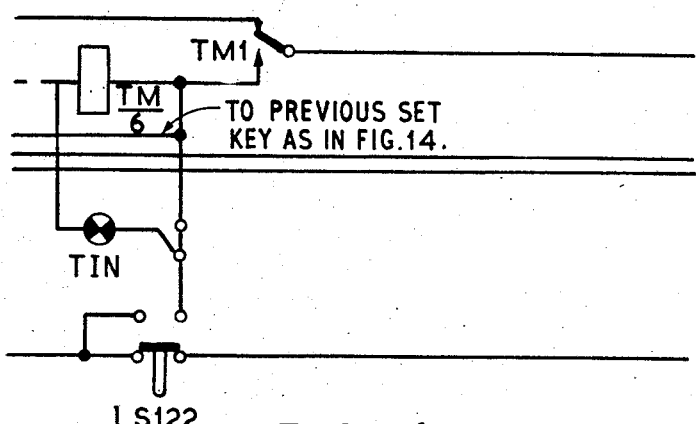
FIG. 16.
INVENTOR
HANS RAINER FERNBACH
BY
ATTORNEYS

| 1 | 2 | 3 | 4 | 5 | 6 | 7 |
|---|---|---|---|---|---|---|
| ✕ | 8 | 9 | 10 | ✕ | 11 | 12 |
| 13 | 14 | 15 | 16 | 17 | 18 | 19 |

FIG. 20.

United States Patent Office 3,191,410
Patented June 29, 1965

3,191,410
MACHINE TOOL CONTROL
Hans R. Fernbach, Bournemouth, England, assignor to
The Loewy Engineering Company Limited, Bournemouth, England, a corporation of Great Britain
Filed June 8, 1961, Ser. No. 115,785
Claims priority, application Great Britain, June 8, 1960, 20,114/60
10 Claims. (Cl. 72—21)

This invention relates to automatic control of presses and other machine tools in which an element has to make a stroke under predeterminable conditions. These conditions relate usually to a parameter of the operation to be performed by the press or machine tool, such as its speed, pressure, temperature, etc.

The immediate problem to which the invention relates is concerned with presses for the extrusion of metal billets, and in particular with metal extrusion presses using billets which have been preheated to elevated temperatures which are not much below the melting temperature of the respective metals. Additional heat is generated in the billets during their extrusion by the work done on them. Usually, this additional heat more than compensates heat losses of the billets to the surrounding walls of the press container, so that the temperature of the billet metal rises during the extrusion stroke. The billet temperature is highly critical as regards the quality of the extruded article, and it is therefore essential for this temperature to be kept within relatively close bounds.

Every metal or metal alloy has a different optimum temperature or temperature range for its extrusion, and these temperatures vary widely for the different metals and alloys. In addition, although to a lesser extent, the optimum extrusion temperatures are determined by the size of the starting billets, the extrusion ratio and the shape of the extruded article and similar considerations.

Since the work done on a billet is directly related to the distance travelled by the extrusion stem of the press, it is clear that, to keep the temperature of the billet within bounds, the speed of travel of the extruded article or of the extrusion stem must be regulated so as to balance the heat losses against the heat generated. It is therefore desirable to provide facilities for varying the speed of operation during the working stroke of the extrusion press.

Many metal extrusion presses have not only an extrusion stem, but also a piercing tool in the form of a mandrel which moves independently of the stem. The same considerations regarding heat generation apply to the piercing tool as to the stem, and it is to be understood that the invention is independently applicable to both stem and piercing tool.

One approach to the problem is to measure the temperature of the extruded article either continuously or at intervals during operation and to control the speed of the stem manually or automatically in accordance with the observed temperature variations. However, it has not been found practical within the limits of press constructions and operation to provide reliable means for measuring the temperature of the extruded article at a point close to the working zone of the press.

The main aspect of the invention consists in a machine tool comprising means for automatically varying an operational parameter in a predetermined sequence during its operation cycle. The invention will be described in relation to an extrusion press for extruding metal billets.

It will be appreciated that it is possible for a skilled press operator to assess from the parameters of each job on the basis of his experience or knowledge a suitable speed pattern for each particular extrusion operation.

It would be possible to provide automatic equipment capable of changing speed at predetermined time intervals under the control of timing equipment. Alternatively, and preferably, the points in the stroke at which speed changes are to occur can be marked by position-sensitive switches, such as limit switches, operable in well-known manner during the progress of the extruded article, or by switches operable through photo-electric cells. The points in the stroke of the press or machine tool at which speed changes should be made may vary from one job to another, as they depend on the size of the billet, the extrusion ratio, the shape of the extruded article and other considerations which entail variations in the distribution of the press effort along the stroke of the pressing stem.

Such variations could be provided by built-in timing equipment. With limit switches it is possible to install a series of such switches along the path of a work-piece, considerably greater in number than the maximum likely to be used in any one job of the press or machine tool and to provide means for selecting any desired combination of limit switches for a particular job. Nevertheless, it is within the scope of the invention to provide a set of limit switches all of which will be used in operations and which may be adjustable in position along the path of the stroke to be controlled.

Hydraulic extrusion presses are nowadays to a great extent operated by direct pump drive. A control of the speed of the pressing stem can then be achieved by providing a plurality of pumps, preferably of different sizes, which work in parallel and to select any desired combination of pumps for a particular speed of the pressing stem, the remainder of the pumps being idle.

The selected combination of pumps may be controlled by a group of relays, the setting of which can be electrically modified as required. To apply the present invention to such presses, the automatic speed-changing equipment would respond to successive operations of a set of limit switches to modify the setting of the relay group.

In the case of hydraulic extrusion presses which are operated by an accumulator drive, the automatic speed-changing equipment of the present invention would determine the setting of the main control valve of the press, which valve would have a number of positions, giving varying degrees of valve opening.

The present invention can also be applied to the changing of the tonnage capacity of a press which has a plurality of parallel-working main cylinders, preferably of different size. Here, the selection of any combination of cylinders results in a different tonnage capacity which is operative on the pressing stem, the remainder of the cylinders being idle.

The invention will now be described with reference to an embodiment shown in the accompanying drawings in which:

FIGS. 1–19 fit together to form a complete circuit diagram of the automatic control of a preset speed pattern for direct operating metal extrusion press, with the control equipment for three intermediate stages out of five omitted, since these three stages are identical with the last stage.

Figure 21:
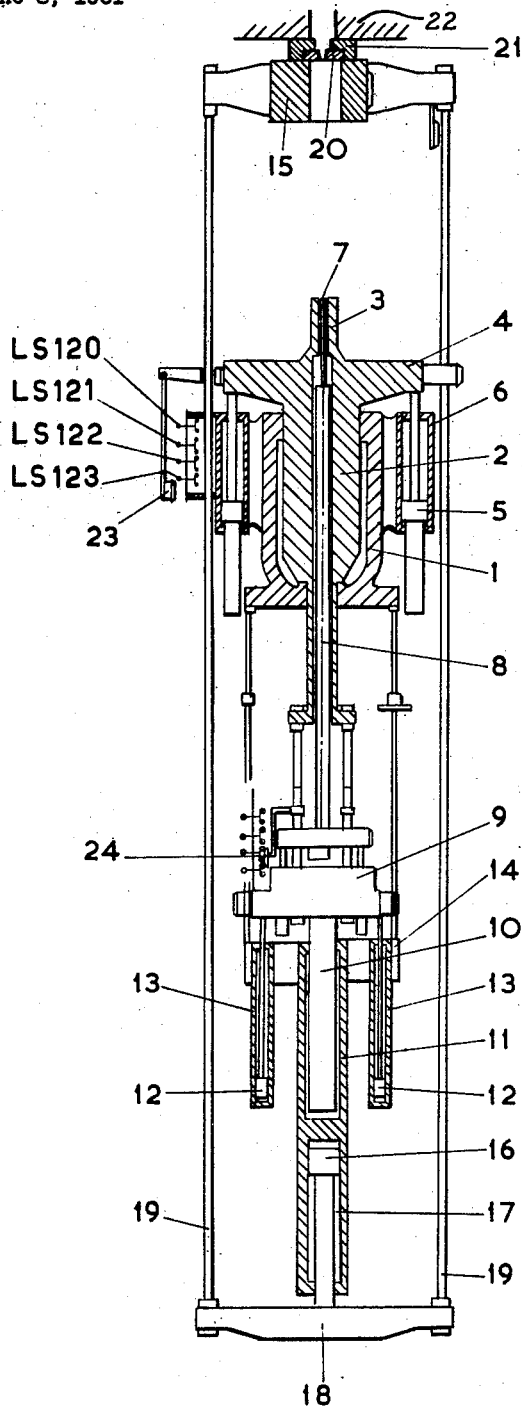

FIG. 20 shows how FIGS. 1–19 are to be fitted together to form a circuit diagram, while, FIG. 21 shows schematically a form of extrusion press with which the control equipment of FIGS. 1–19 can be used.

In the drawings, all switch wipers are shown on their home positions, and all moving contacts, such as relay contact springs are shown in their unoperated or rack positions.

Referring first to FIG. 21 the extrusion press shown therein comprises a main cylinder 1 and a main ram 2 which is shown here as being in one piece with and terminating in a pressing stem 3. It is to be understood that in normal practice the pressing stem and the main ram will be made in separate parts and that the pressing stem will be attached to the main ram by a holder, in well known manner. Attached to a cross-head 4 formed on the main ram 2 are return rams 5, movable in return cylinders 6, one set of rams and cylinders being arranged at either side of the centre-line of the press.

Passing through the pressing stem 3, which to this end is hollow, is a piercing mandrel 7, attached to a mandrel shaft 8, the latter passing through a bore in the main ram 2 and through an opening in the end wall of the cylinder 1. The mandrel shaft 8 is attached to a cross-head 9 which can be moved forward by a piercing ram 10, slidable in the cylinder 11. The return movement of the mandrel and mandrel shaft is effected by return rams 12, slidable in cylinders 13 attached to a stationary cross-head 14.

The press has further a billet container 15, arranged in the same axis as the pressing stem 3 and the mandrel 7 and axially spaced-apart from them, the container being axially displaceable by means of a ram 16 and a cylinder 17 arranged next to the piercing ram 10 and piercing cylinder 11, the ram 16 being connected to a crosshead 18 which in turn is attached by rods 19 to the container 15. An extrusion die 20 is placed next to the container 15, the die being mounted in a holder 21, the latter being backed by a platen 22. The main cylinder 1 and the platen 22 are connected to each other by columns, not shown.

It is to be understood that the press is only diagrammatically shown and described here and that it can be of any well-known and suitable construction.

The extrusion press described and shown here is operated in such a way that the metal billet is first placed into the container 15. Thereupon the mandrel 7 is advanced, piercing the billet and entering the aperture of the die 20. In the next step the pressing stem 3 enters the container and extrudes the billet through the die aperture into the shape of the finished article, with the exception of a short end portion of the billet, which remains in the container and cannot be extruded. In some presses the billets are prepierced so that piercing by the mandrel is not necessary. It is to be understood that in the case of the extrusion of solid articles a mandrel is not required.

It is during the extrusion of the billet from the container 15 by the pressing stem 3 that the heat control according to the invention can be employed with advantage. In some cases the piercing movement of the mandrel 7 can be likewise controlled by means according to the invention.

The equipment used for speed control purposes is of the kind which has been used for automatic telephone exchanges, and other remote control and supervisory purposes for many years. The conventional apparatus used in such systems mainly consists of low-current electromagnetic contact-making relays, and rotary wiper-switches. The relay is essentially very simple in conception: it consists of a channel-shaped magnetic core having an armature of soft magnetic material pivoted at one end to one pole of the core so that the free end of the armature can move to and from the other end of the core. One or more legs of the core carry an energizing coil for temporarily magnetising the core while the coil is energized. One or more pairs or sets of long contact springs are so arranged that movement of the armature to and from the core changes the setting of the contact springs (e.g. from open to closed). The contact springs sets can be simple pairs of springs, or so-called "change-overs" in which one movable spring is normally in contact with a first fixed spring, but when moved, the movable spring opens its contact with the first fixed spring, and makes contact with a second fixed spring.

The wiper switch has a semi-circular contact bank, carrying several 180° arcs of separate closely-spaced small contacts, for example 25, or 50, or 100 contacts arranged in a 180° arc. The arcs are concentric with one another and closely-spaced in an arcuate contact bank, from which the contacts project within the arc to be contacted with rotary wipers, and also project on the outside of the arc for the connection of connecting wires. The wipers are radial spring-contact arms mounted on the rotatable switch shaft so that the free end of each wiper moves over the contacts of a corresponding arc of contacts in the contact bank when the switch shaft rotates. All the wipers are in line, so that at any moment they are all in contact with a line of bank contacts, one in each arc. The switch is rotated by a ratchet on the shaft, which is turned step by step by a pawl moved forwards and backwards by the armature of an electro-magnet, which is very much like a relay. Each step of the ratchet moves all the wipers together from one line of contacts in the contact bank to the next line of contacts.

The pawl can step the ratchet when moved forward by energization of the switch magnet, or when moved back by a spring when the switch magnet is de-energized.

The so-called contact "pile-up" of a relay can contain a number of pairs and/or change-overs. A switch can have many wipers and associated contact arcs. The contact springs of a relay may do several different jobs in different circuits, and so may the individual wipers and contact arcs of a switch. Of course, the different functions must be so related that they are all to happen together, because the relay contacts are all operated together and returned together, and all the switch wipers move together. Nevertheless, there is much scope in a complex control circuit for numbers of different switching functions to take place simultaneously.

It has been found therefore that it is better to arrange the relay contacts and the individual switch wipers and their arcs on a circuit drawing according to the function they perform. Thus, a relay coil and its operating circuit may be in one part of a circuit, while the individual pairs or sets of relay springs of the relay are spread about the diagram, each in the actual operational circuit to which it belongs. Similarly, a switch magnet and its operating circuit is in one place, and its individual wipers and contact arcs are distributed about the diagram according to the function which they perform. However, the constructional relation is recognizable from the reference symbols used. A relay such as A will have its contacts marked A1, A2, etc., which are shown in their normal or unoperated position on the drawing. The number of sets of contacts belonging to a relay are indicated by the number below the relay reference on the drawing: e.g.

$$\frac{ST}{6}$$

on FIG. 1.

Figure 3:
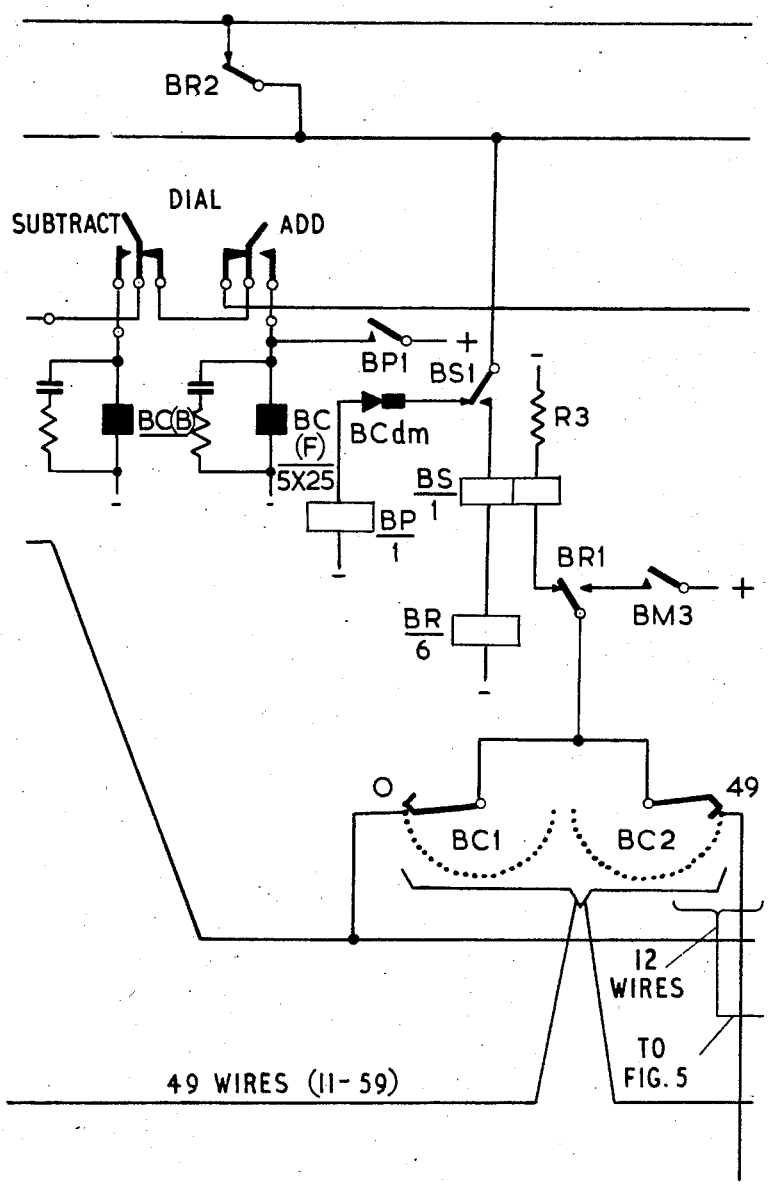

A switch B will have wipers BC1, BC2 . . . and one or more magnets BC(F), BC(B), FIG. 3. A switch may have interrupter contacts such as DB*dm*, FIG. 1, which are openend and closed once for each step taken by the switch. This method of distributing relay and switch parts in a circuit drawing is called the "divorced-contact" technique, and has been established for many years.

Thus, an operating circuit in the diagrams may start from negative or positive battery potential, pass in series through contacts belonging to several different relays, possibly also via a switch wiper and a particular contact to which it has previously been set, through a relay or magnet winding, to the other pole of battery.

Control may be exercised by a switch or switches via so-called "wire-multiples." Thus, if a number of switches are to exercise like controls over a set of relays, but only one switch is to exercise control at any one time, then the bank contacts of all the switches concerned can be connected to the windings of the relays in the desired combinations.

Thus, one relay winding can be connected to contacts of a number of switches, so as to be operable when any one of the switches is set to the particular contact concerned. This multiple technique is used in controlling the set of control relays AA–HB, FIGS. 6, 12, 19, from the banks of the control switches such as BC, LC, e.g., FIGS. 9, 10, 18, so that the relays can be operated in different combinations to select different press-speeds.

With semi-circular contact banks, it is clear that during a complete rotation of a wiper, it is on its contact arc for half the rotation, and out of the arc for the other half. If, however, two wipers are set 180° apart, so that they are diametrically in line, then as one wiper leaves its arc of contacts, the other wiper enters its arc. In this way, two such wipers electrically connected together, constitute with their bank contact arcs a 360° contact arc having twice the capacity of the actual contact bank. Thus two 25-point contact arcs, with their wipers electrically connected and 180° apart, effectively constitute a single 50-point switch arc, and the switch is operative throughout its complete rotation. Whichever direction in which such a switch moves, forwards or backwards, at every step contact is changed from one bank contact to another, whether by the same wiper, or by changing wipers as one wiper leaves its arc and the other enters its arc.

It is usual with such switches to have one wiper and its arc allocated for homing purposes: that is to say, for returning the switch to its home position, with the wipers on the first contacts of their arcs ready to be set again to any desired position.

On the homing arc, such as DB8, FIG. 1, all the contacts except the first are multipled together and connected to a circuit to a switch stepping magnet, so that when the homing circuit is closed, the switch will step from wherever the wipers are standing, over the remaining contacts in turn, until the home contact is reached, when the homing circuit is opened, and the switch stops.

The equipment which is shown diagrammatically in the circuits of FIGS. 1–19, include the following apparatus.

Figure 4:
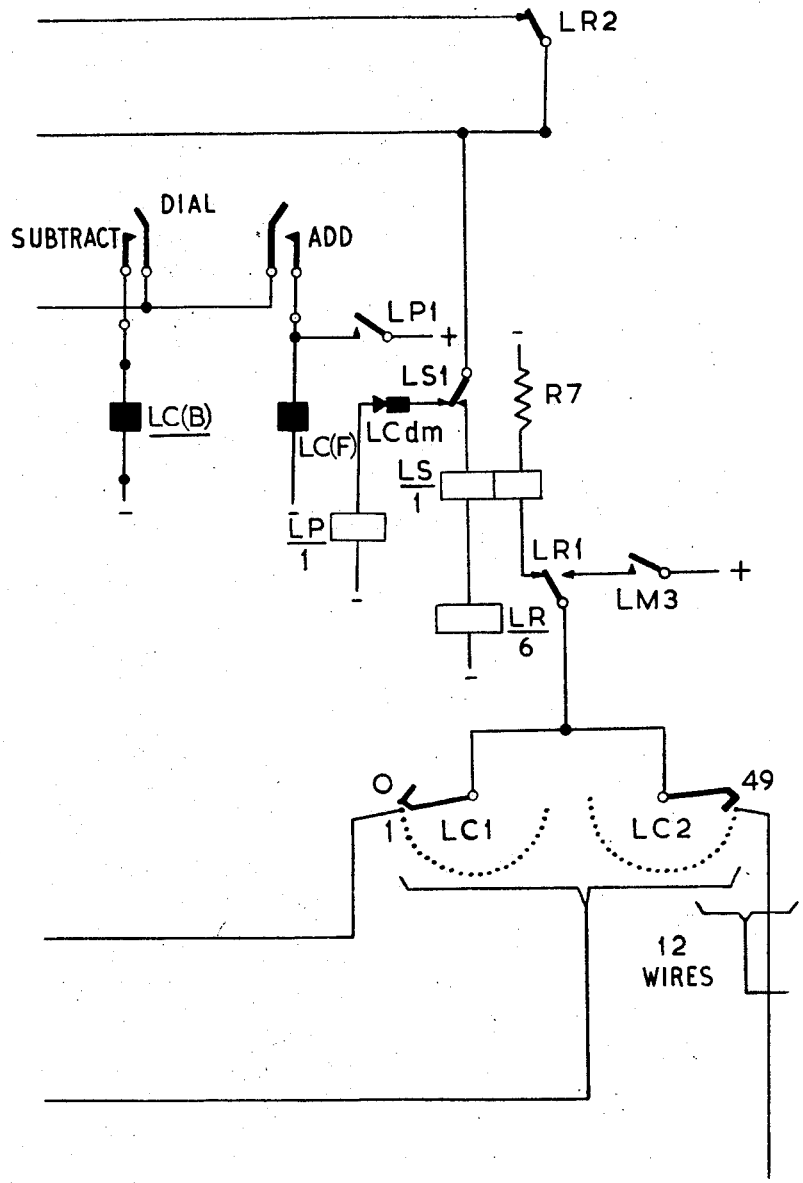
Figure 5:
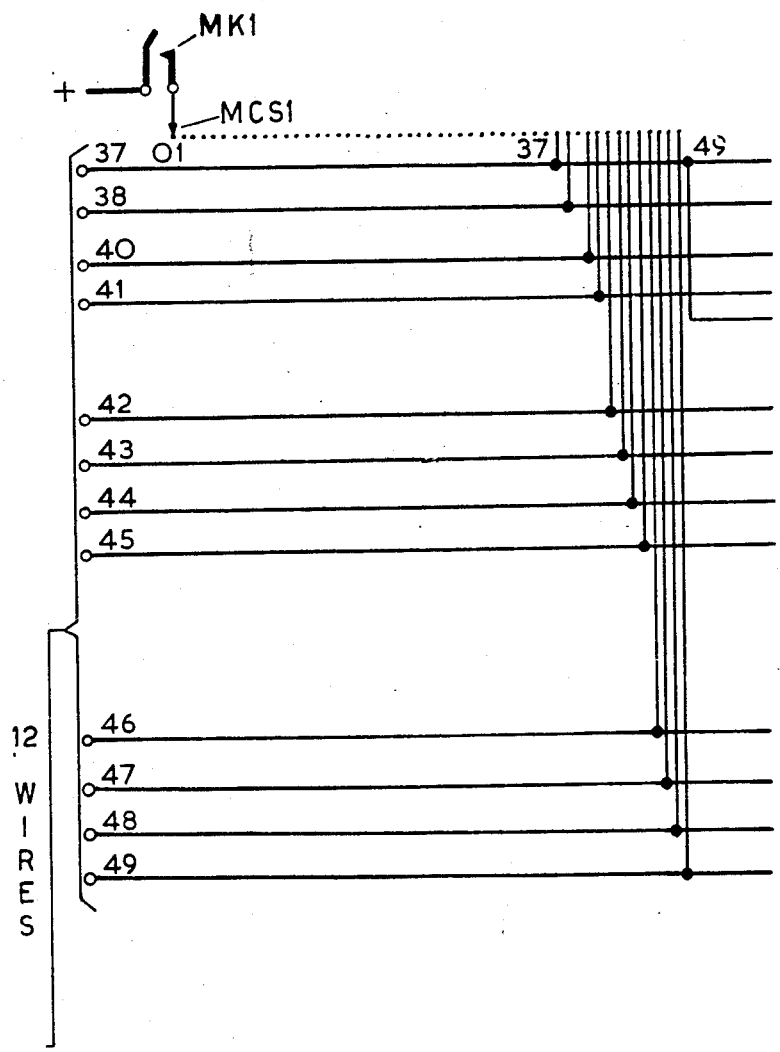
Figure 11:
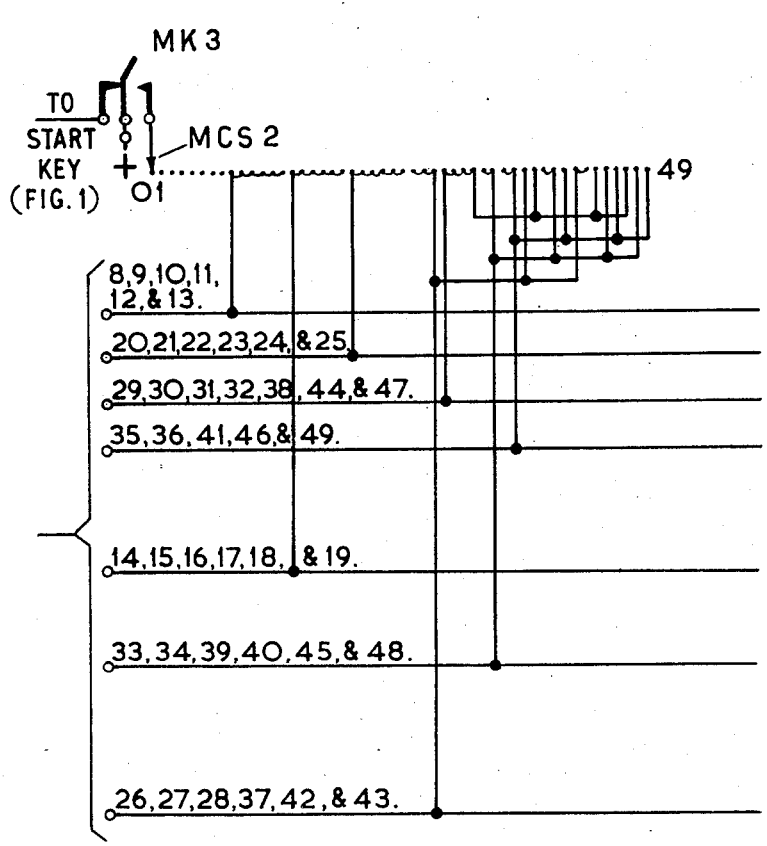
Figure 14:
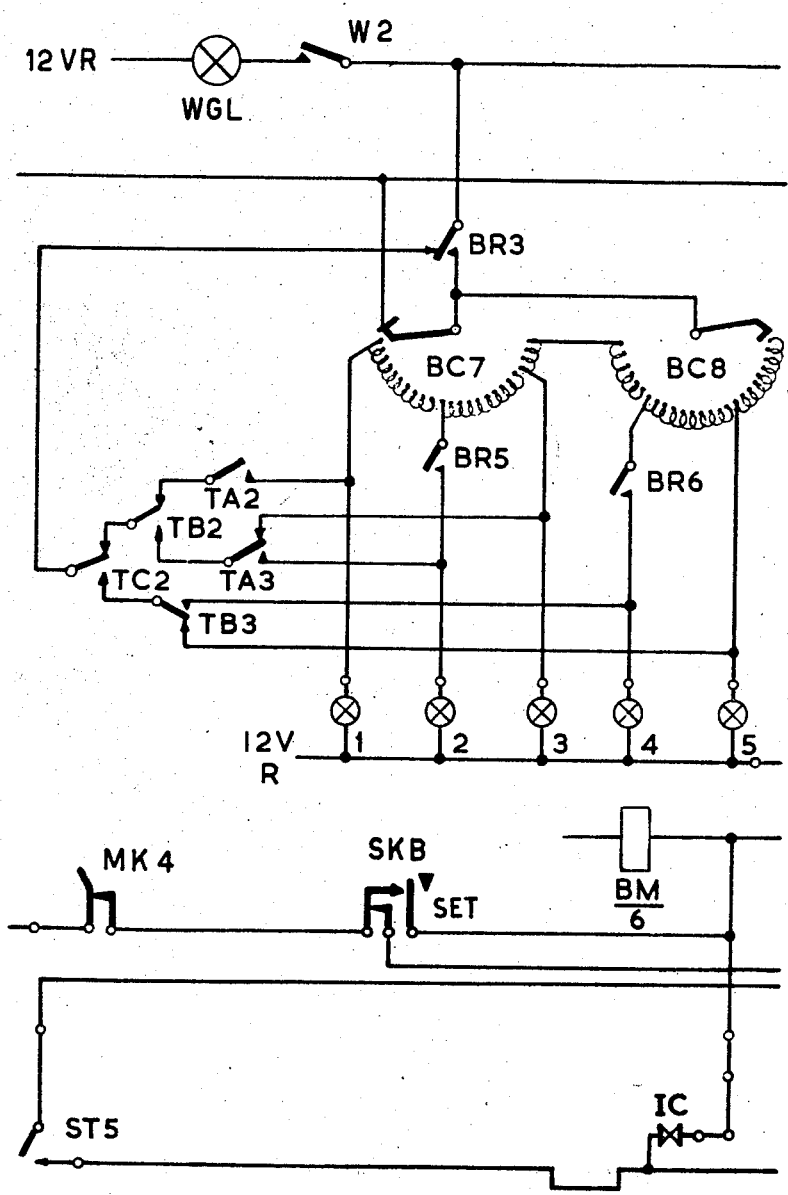
Figure 17:
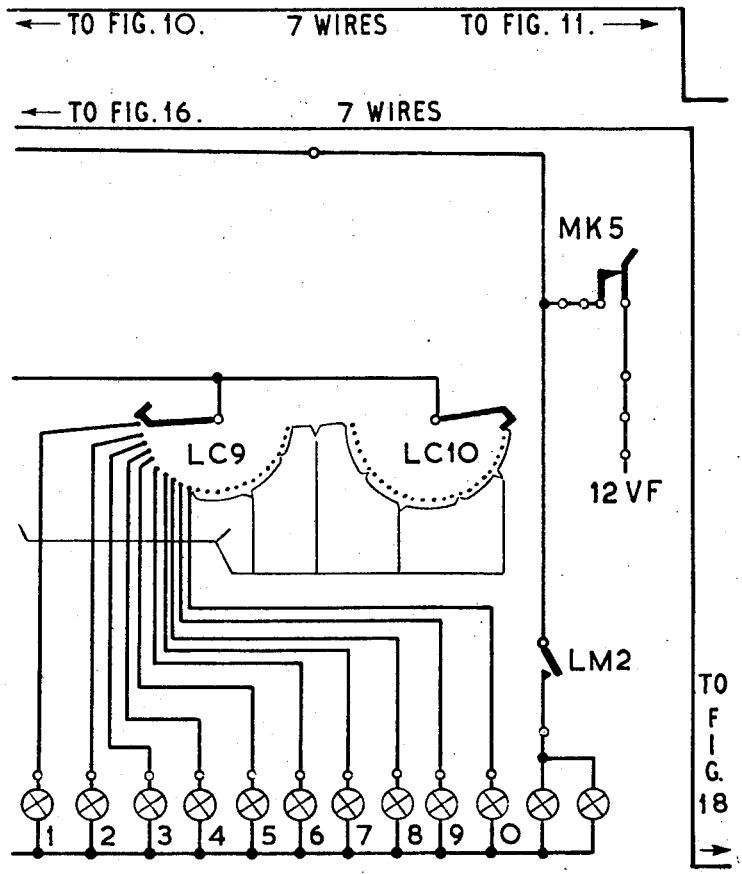
Figure 17:
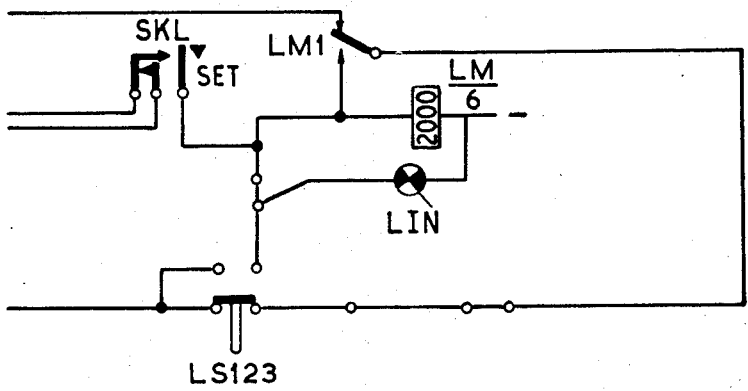
Figure 18:
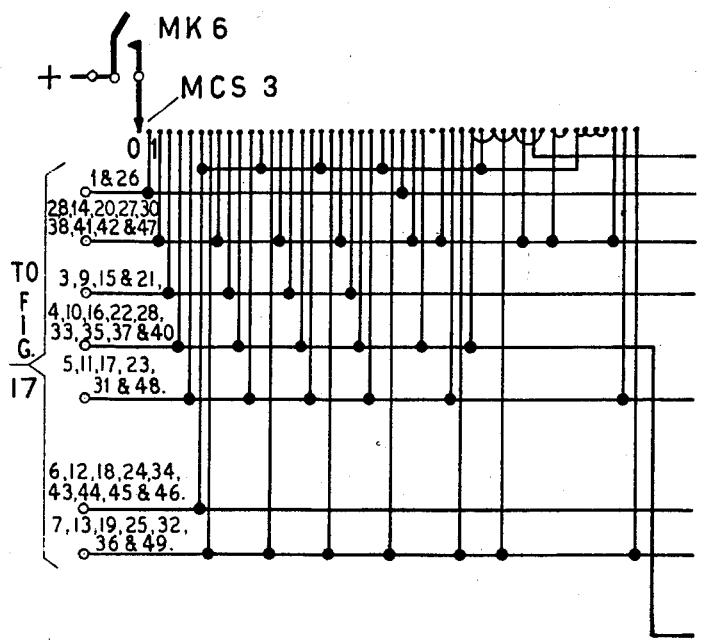

The speed setting controls comprise an automatic telephone dial schematically shown in FIG. 1, five digital number lamp indicators, of which two are shown on FIGS. 14–17; a Start key having contacts STK1, 2 shown in FIG. 1; five "set" push keys of which two, SKB, SKL, are shown in FIGS. 14, 17; five pairs of "dial" keys for "Add" and "Subtract," of which two are shown in FIGS. 3, 4; a manual control key, having contacts MK1–6, FIGS. 5, 6, 11, 14, 17 and 18; a manual 49-position switch, MCS1–3, see FIGS. 5, 11, 18; and a warning lamp WGL, see FIG. 14.

There are one unidirectional uniselector DB, FIGS. 1, 2, 8, 13, and five bothway uniselectors of which only two, BC, LC, are shown in FIGS. 3, 4, 9, 10 and 14–17; one relay set carrying miscellaneous control relays, and a high-voltage relay set comprising the relays used to control the pump relays. The relays AA–HB, FIGS. 6, 12, 19, on this high-voltage relay-set are for switching 220 volts A.C. to the pump relays: it should be noted therefore that whereas the rest of the control equipment employs either 50 volts D.C. or 12 volts A.C., the high-voltage relay set contacts are connected to 220 volts A.C.

The regulated power supply equipment is fed from the 220 A.C. supply and provides 50 volts D.C. output for the operation of relays and uniselectors, and also provides 12 volts A.C. output for the display lamps.

It will be seen that there are five bothway uniselectors, five "dial" keys, and five "set" keys, which are arranged in five groups each comprising one of each of the above, and each group constitutes a separate speed control equipment, one of which controls the starting speed for an operation, while the other four are controlled by four limit switches, e.g. LS122, LS123, FIGS. 16, 17, which are placed along the path of the pressing stem 3, FIG. 21, and which can change the ram speed as each limit switch is operated in turn. Only two of the five speed control equipments are shown on the drawings.

Figure 6:
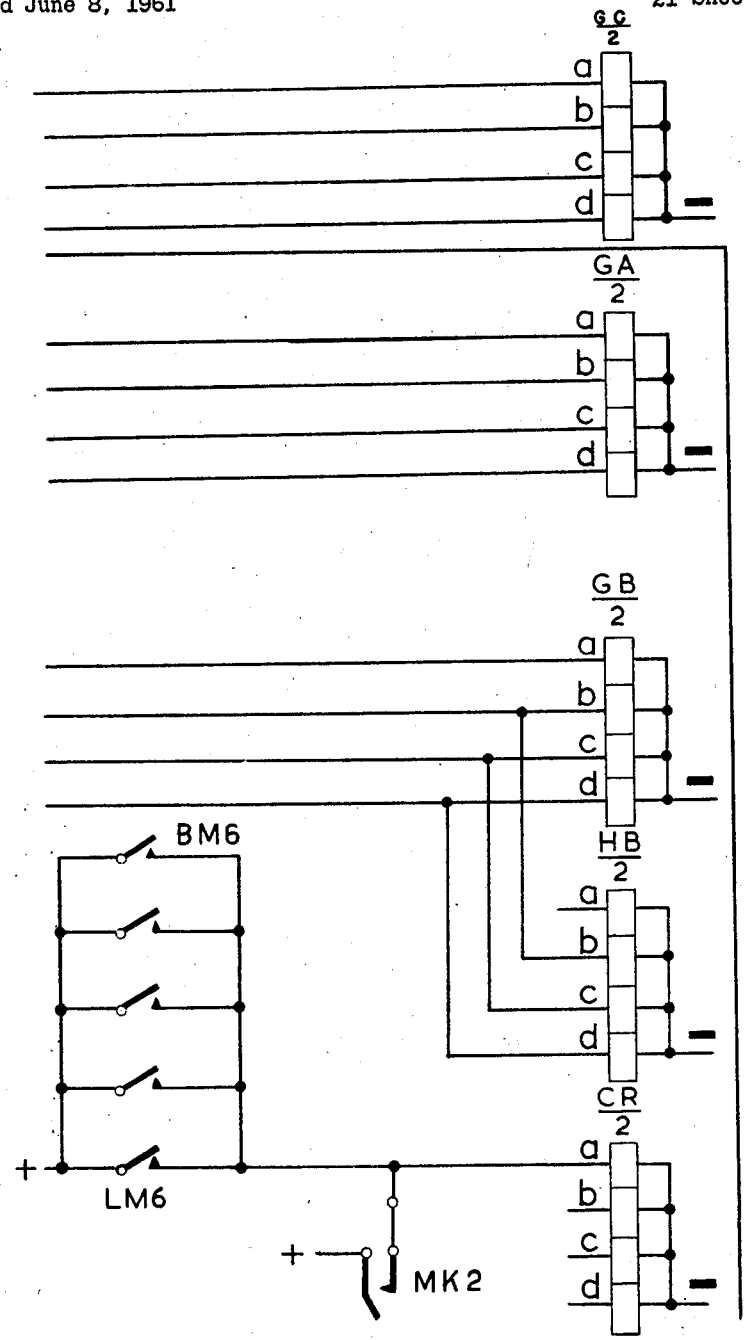
Figure 7:
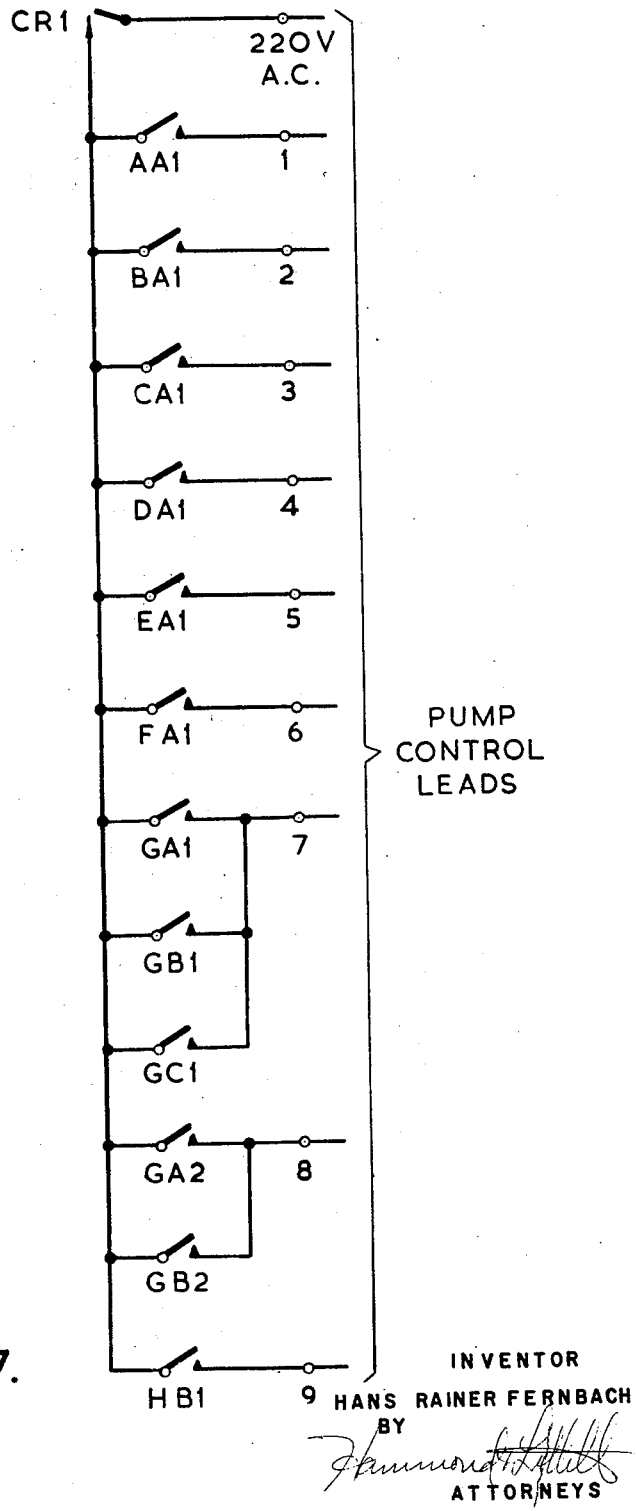
Figure 12:
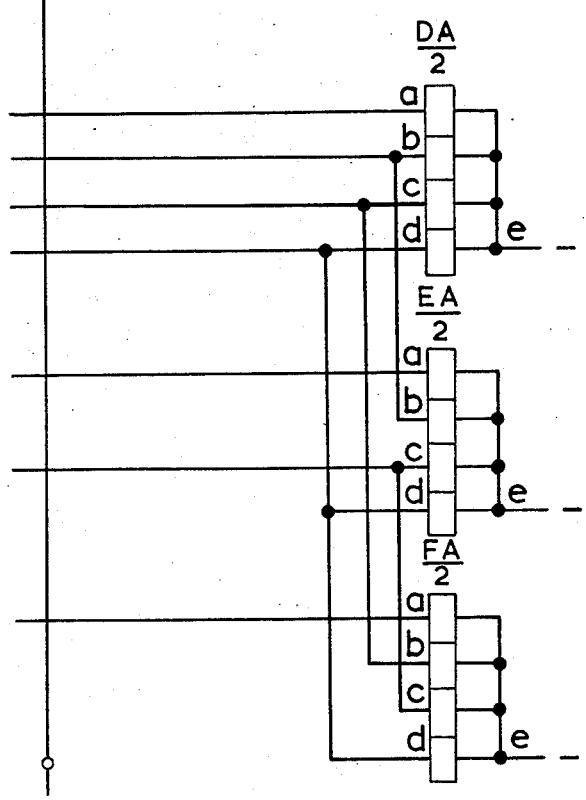
Figure 19:
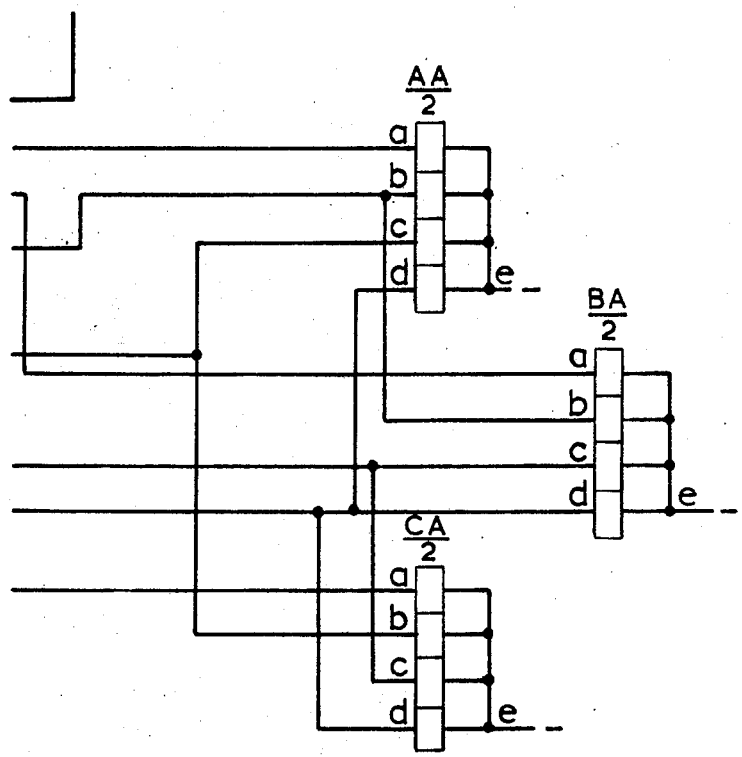

The control equipment of FIGS. 1–19, is arranged to provide forty nine extrusion speeds in steps from .12 mm./sec. to 14.16 mm./sec., by different combinations of pressure fluid pumps (not shown) controlled via leads 1–9, FIG. 7, by ten relays AA–GA, GB, GC, HB, FIGS. 6, 12, 19. Each speed has a number from 11–59.

The extrusion speed can be varied during extrusion in four stages. Each speed change can be preset and is initiated by one of four limit switches, of which two LS122, LS123, are shown in FIGS. 16, 17, and which are adjustable to be actuated in any position in the extrusion stroke. The four changes plus the initial speed give five speed settings.

The following sequence must be followed to select a given starting speed and the four subsequent speeds:

(1) Operate the START key to close contacts STK1, 2, shown separately in FIG. 1.

(2) Dial the required starting extrusion speed: one of numbers 11–59. This is done in the manner normal to two-digit telephone dialling. All five switches such as BC, LC will be set to the required number as described below and the digital lamp indicators will now indicate the number selected. Under this condition the extrusion speed would be constant throughout the stroke of the machine.

(3) The speed changes required at each of the four stages are individually set in the following manner.

It will be remembered that the control switches BC, LC are 25-point switches, with paired sets of wipers 180° apart, so as to act as 50-point switches. The switches can be stepped forward or backward, and the direction to be used can be chosen so that the switch is moved by the shorter of the two possible routes from its existing setting to a new setting. The speed change is made by adding or subtracting the difference between the speed number on which the control switch in question is standing and which is showing on the corresponding lamp indicator, e.g. FIGS. 14, 15, and the desired speed number. If, for example, the indicated speed is 25, one wiper is standing on its last contact. If the desired speed is 12, the quickest direction in which to step the switch to reach setting 12 is by stepping the switch back to subtract 13, the operative wiper moving back from its contact 25 to its contact 12. The alternative is to step the switch forward 25 steps to add 25, during which the first wiper leaves its arc and the second wiper of the pair moves over its entire arc to the last contact 50. The switch has then to be stepped forward a further 12 steps to bring the first wiper on to contact 12. Thus by moving backwards, a movement of 13 steps is adequate, as against 37 steps in the forward direction. The addition or subtraction required must be dialled in single digits: if the difference is more than 10, then a plurality of single digits adding up to the difference must be dialled in turn. A difference of 28 can be obtained by dialling either 7 four times=28; or by dialling 10 twice, followed by 8. Ten is dialled by the single digit "0", which results in ten impulses.

To increase the speed at any one of the five stages, the corresponding "dial" key (FIGS. 3, 4) is put to Add, before dialling. To decrease the speed the corresponding "dial" key is put to Subtract. In both cases, the dialling circuit from FIG. 1 is connected to the respective magnet; e.g. BC(F) or BC(B); of the corresponding two-way switch; e.g. BC, FIGS. 3, 9, 15.

The setting of the control switch at each stage can be changed individually in the above manner. Only one stage can be so set at a time.

The "set" keys associated with each control stage, of which two SKB, SKL are shown in FIGS. 14 and 17, will, if operated, initiate the speed change required by the setting of the corresponding control switch, thereby effecting manually the same operation as the corresponding limit switch, e.g. LS122, FIG. 16; or LS123, FIG. 17.

(4) If a new set of speed settings are required differing greatly from the previous settings, the START key should be opened to reset all the switches to the home position, after which the START key should again be set to "Start" and the above sequence repeated.

(5) The warning light WGL, FIG. 14, indicates a mistake in operation of the speed setting controls. The controls are reset by resetting the "Start" key.

(6) Direct operator control of speed can replace the 5-stage automatic control explained above. For this purpose, a three-arc "49-position" switch, MCS1–3, shown in FIGS. 5, 11, 18, can be manually set to any desired position. The Manual "49-position" switch, FIGS. 5, 11, 18, is put in circuit by operating the "manual" key switch, FIGS. 5, 6, 11, 14, 17, and 18. With the "manual" key operated, no speed change steps are possible through limit switch actuation, or through setting-key actuation. The Manual selector switch is suitable for use when constant speeds are being used throughout the stroke of the pressing stem 3, or when speed changes are to be initiated manually during a stroke.

The 49-position switch operates a desired combination of the relays AA–HB via the same control wires which are multipled to the control switches such as BC, LC, and thus controls the pump relays in the place of the automatic control by the uniselectors.

The operation of setting up a speed programme will now be generally described, but only in sufficient detail to give the reader a broad picture of the operational sequence. The detailed circuit description will follow later.

Operation of the "Start" key (FIG. 1) prepares the equipment to respond to the dialling-in of the basic setting number in the series 11 to 59 inclusive.

Of course, each control switch could be individually set from its previous position, instead of setting all the control switches to the starting-speed setting, and then adjusting the individual settings of the control switches other than the first. However, when the speed changes are small, the two-stage setting may save time.

Figure 2:
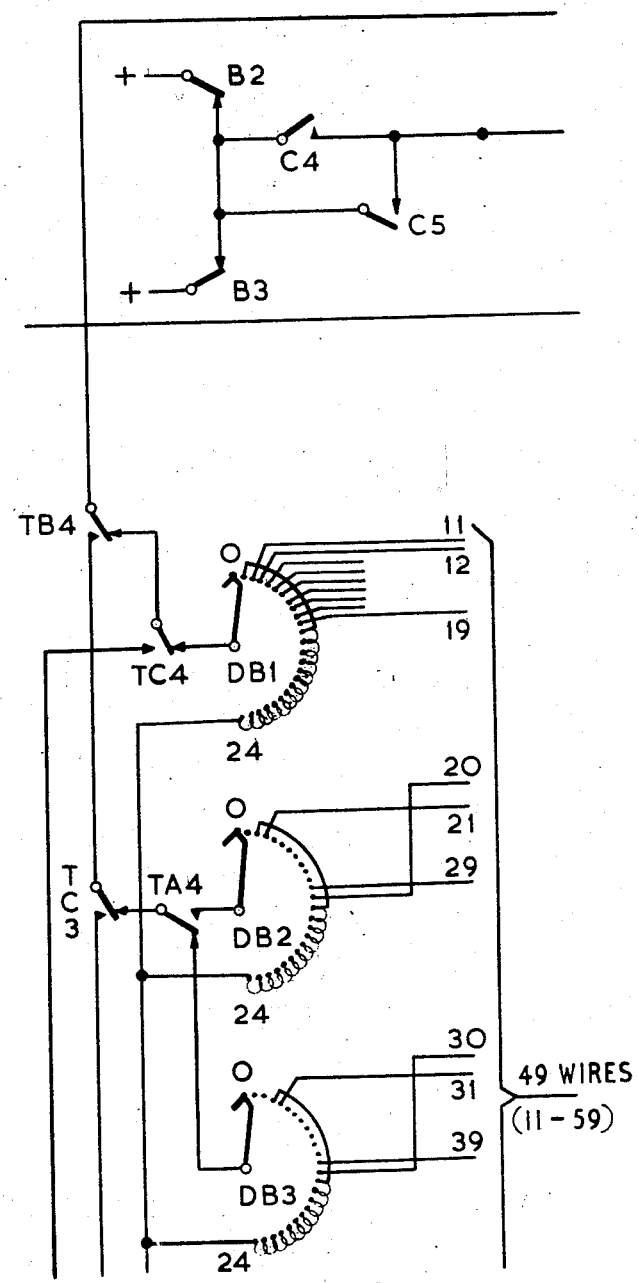
Figure 8:
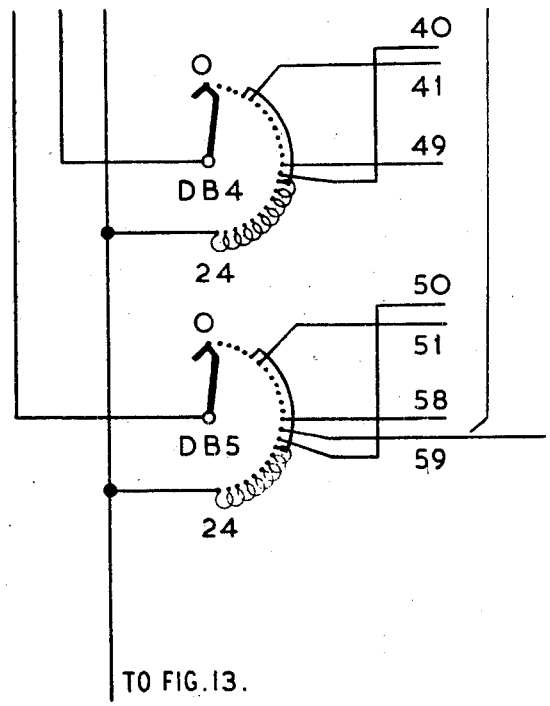

The first digit dialled steps the unidirectional uniselector DB, FIGS. 1, 2, 8, to one of positions 1–5, resulting in the operation of relays TA, TB, TC (FIG. 13), either singly or in combination to record in code the value of the first digit dialled, which may have any value from 1 to 5. The first digit dialled as recorded on relays TA, TB, TC is displayed as the tens digit on the basic setting lamp indicators, 1–5, FIGS. 14 and 16.

When the second digit is dialled the DB uniselector is stepped one to ten steps, according to the digit dialled, from the positions reached in response to the tens digit. On the completion of this digit the five bothway uniselectors, of which two (BC, LC) are shown in FIGS. 3, 4, step to the appropriate one of the 49 positions determined by the positioning of the DB uniselector, by marking leads from contact banks DB1–DB5, FIGS. 2 and 8, to banks of the five bothway uniselectors of which two are shown at BC1, 2, and LC1, 2, FIGS. 3 and 4 respectively.

As each bothway uniselector steps on the correct position it operates its associated stop relay, e.g. BS (FIG. 3), LS (FIG. 4), and displays the tens and units setting on the five sets of digital indicators, each consisting of lamps 1–5 and 1–0, of which two are shown associated with the switch banks BC7–10, LC7–10, FIGS. 14, 15, 16, 17.

The setting of any one of these five uniselectors may now be advanced or reduced by operating the associated "dial" key, FIG. 3 or FIG. 4, to either Add or Subtract position and dialling as required. A single dial key arranged to be thrown to operate the Add and Subtract contacts separately, or two separate keys, may be used. Only one bothway uniselector, e.g. BC, FIG. 3, or LC, FIG. 4, may be positioned at a time in this manner. The respective digital lamp indicators indicate the various speed control settings.

Figure 15:
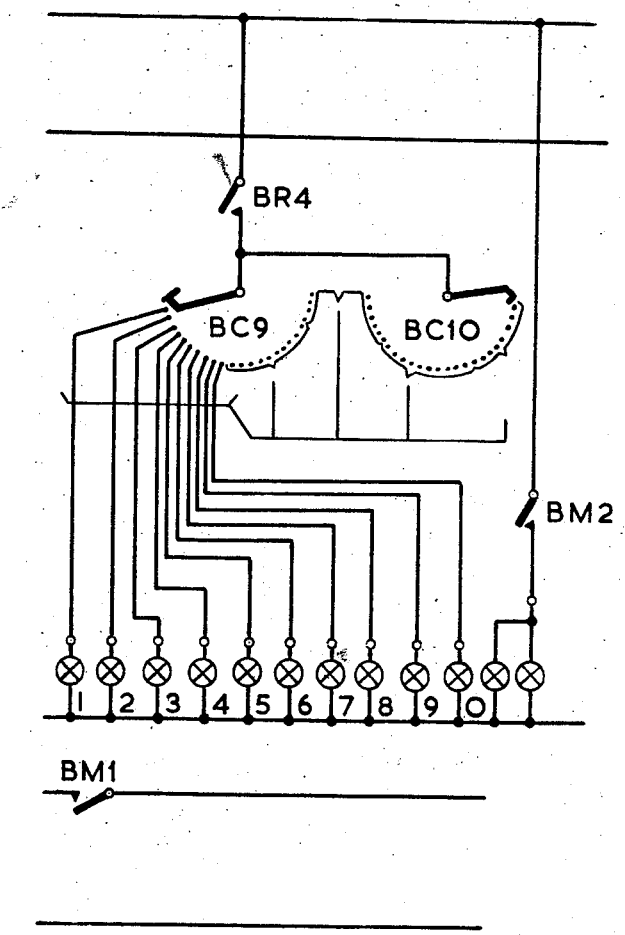

At the start of an operating cycle of the press, relay BM, FIGS. 14, 15 is operated to cause the first bothway uniselector BC to control the operation of relays in the series AA–HB, FIGS. 6, 12, 19, either singly or in combination. These relays in turn control the operation of the pump control relays via pump control leads, FIG. 7, to set the starting speed of the ram.

As the press proceeds through the cycle of operation, it operates, in sequence, the limit switches of which two are shown for explanatory purposes in FIGS. 16, 17 at LS122, LS123. These limit switches operate in turn the associated relays, e.g. LM, FIG. 17, each of which in turn releases the preceding relay such as BM (FIG. 14). The successive operation of the relays BM–LM causes the associated bothway uniselectors in turn to control the pump relays according to the programme set up by dialling. The setting which is in use at any time is indicated by the lighting up of lamps one on each side of the relevant digital lamp display, under control of contacts such as BM2, FIG. 15, or LM2, FIG. 17: in the drawings, the two lamps are shown together, for convenience, operated in parallel from the respective relay contacts, e.g. BM2, FIG. 15.

The "Set" keys on the control panel, two of which SKB, SKL are shown in FIGS. 14, 17, are arranged to operate the above-mentioned relays, e.g. BM, LM, in a manner similar to the limit switches.

The setting of the equipment for speed control of a pressing operation will now be described.

With the Start Key and the Manual Key in the off or open position, all relays are released and there is no circuit to the pump relays.

Operation of the Start key, FIG. 1, with the Manual key in the off position, operates relay A, FIG. 1, via the DIAL impulse springs PC, Start key contacts STK2, and the normal contacts of a change-over spring set MK3, FIG. 11, on the Manual key.

Operated contacts A1 (FIG. 1) operate relay ST to positive via wiper DB8 and its home contact, thus checking that the DB uniselector is on the home position ready to receive the dialled pulses.

Operated contacts ST1 (FIG. 1) provide an alternative circuit for relay ST to alternative operated contacts STK1 of the Start key, so as to hold relay ST operated when the DB uniselector steps off the home position.

Operated contacts ST2 (FIG. 1) disconnect the DB uniselector self-drive homing circuit via its interrupter contacts DBdm, which is described later, and prepares a circuit to operate relay B (FIG. 1).

Operated contacts ST3 (FIG. 1) prepare the stepping circuit to the DB uniselector driving magnet DB25.

Operated contacts ST4 (FIG. 13) prepare a circuit for the operation of relays in the group TA, TB and TC.

Operated contacts ST5 (FIG. 14) prepare a circuit for the operation of relays BM, LM from the corresponding limit switches. The sixth set of contacts belonging to relay ST are not used (or shown).

When the dial is moved away from the normal position, the "dial-off-normal" contacts DON (FIG. 1) close and connect positive potential from MK3 (FIG. 11) via Start key contacts STK2 (FIG. 1), through normal contacts B1 to the junction between relay B coil and the 500 ohm resistor R1. This prevents the operation of relay B, when the DB uniselector steps off the home position from positive, via wiper DB8 off normal, ST2 operated, C2 normal, W4 normal.

When the dial is released, it returns to the normal position by spring action, opening and closing the pulsing contacts PC a number of times depending on the digit dialled. This opening and closing of the pulsing contacts PC occurs at a rate of ten pulses a second. At each opening relay A is released, and at each closure of the contacts, relay A reoperates. The dial pulses are repeated by contacts A2 to the DB uniselector driving magnet DB25: Positive, MK3 (FIG. 11), STK2 (FIG. 1), W3 normal, ST3 operated, A2, B4 operated, DB25, negative. Thus when the dial contacts open, relay A releases, closing contacts A2 and operating the DB uniselector drive magnet DB25, and when the dial contacts close, relay A reoperates, opening contacts A2 and de-energizing DB25, so as to allow the magnet armature to restore under spring tension in well-known manner, advancing all the DB wipers to their next contacts.

When the dial returns to normal at the end of the digit, the dial off-normal contacts, DON, open, removing the short-circuiting connection from the B relay coil. Relay B operates from negative via R1 to positive via W4 normal, C2 normal, ST2 operated, off-normal contacts and wiper DB8.

Operated contacts B1 (FIG. 1) prepare a circuit for the operation of relay C when the units digit is dialled; normally-closed contacts B2 and B3 (FIG. 2) open to prevent premature operation of the bothway uniselectors; operated contacts B4 (FIG. 1) provide an alternative pulsing circuit to magnet DB25 to cater for the condition when relay C operates; while operated contacts B5, (FIG. 13) complete the circuit from TA, TB, TC relay group via wiper and arc DB7, B5 operated, C6 normal, W1 normal, and ST4 operated to positive.

For digit 1, wiper DB7 is on its second bank contact 1 and relay TA alone operates;

For digit 2 DB7 is on bank contact 2, and relays TA and TB both operate.

Similarly for digit 3, relay TB alone operates;

For digit 4, relays TC and TB both operate; and

For digit 5, relay TC alone operates.

The operated relays hold via their own operated contacts TA1, TB1, and TC1, via W1 normal, and ST4 operated to positive. According to which of contacts TA2, TA3, TB2, TB3 and TC2 (FIG. 14) is or are operated, one of the tens digit lamps 1–5 lights and displays the digit dialled: regulated 12 volt power supply 12V.R (FIG. 14) connected in parallel to tens digit lamps 1–5; selected lamp; those TA, TB, TC contacts which are operated; BR3 normal, via FIGS. 15, 16 and 17, and the normal contacts MK5 of the Manual key (FIG. 17); 12VF.

Contacts TA4, TB4, TC3 and TC4, (FIG. 2) are used to select among the DB arcs 1–5 (FIGS. 2 and 8), according to the tens digit dialled.

The switch DB has already been set by the first digit to one of its bank contacts 1–5, counting the home contact as 0. The switch will therefore step from the contact on which it is standing in response to the second digit.

The different wipers DB1–5 are respectively allocated to tens digit values 1–5, so that the wiper DB1 will effectively step from contact 1 in response to the second digit, DB2 will step from contact 2, and so on. In consequence, the ten contacts 2–11 of bank DB1, the ten contacts 3–12 of DB2, and the ten contacts 6–15 of bank DB5, are the positions which the corresponding wipers may reach in response to the second digit following their allocated first digit values. In consequence, arc DB1 has 9 wires connected to contacts 2–10; which represent the numbers 11–19 inclusive. The wires from contacts 2–10 of DB1 are multipled to contacts 11–19 of each of the 5 bothway uniselectors. Arcs DB2, 3, 4 and 5 each have ten wires (3–12, 4–13, 5–14, 6–15) representing the numbers 20–29, 30–39, 40–49 and 50–59 inclusive in each case, multipled to the corresponding bank contacts on each of the 5 bothway uniselectors, of which only BC, LC are shown.

It will be noted that although the switches BC, LC are 25-point switches, their wipers, e.g. BC1, BC2, are 180° staggered, in the manner previously described, so that the switches are effectively 50-point switches. The pair of wipers BC1, BC2 with their banks in effect form a single 50-point switch.

Contacts TA5, TB5 and TC5 are not used.

When the dial is moved off-normal to send in the units digit, closure of the dial off-normal contacts DON (FIG. 1) operates relay C via the operated B1 contacts, DON, STK2 operated, MK3 normal (FIG. 11). Operated contacts C1 provide an alternative hold circuit for relay C on its second winding so that the subsequent release of relay B will not release relay C.

The change-over of contacts C2 opens the operating circuit of relay B, but temporarily closes over its front contacts, a holding circuit for relay B via the dial off-normal contacts, DON, and STK2 to MK3 (FIG. 11).

The change-over of contacts C3 has no effect at this stage, since B4 is operated. Operated contacts C3 are used later, when contacts B4 are normal, to direct impulses from contacts A2 to a selected both uniselector when adding or subtracting from the basic setting.

Operated contacts C4 and C5 in parallel (FIG. 2) prepare a self-drive circuit for the 5 both uniselectors including BC, LC, (FIGS. 3, 4). Contacts C6 (FIG. 13) are opened to disconnect the circuit to wiper DB7 so that if switch DB stopped on any one of bank contacts 1–4 after the first digit, the stepping of switch DB over bank contacts 2–5, or some of them on dialling the units digit will not incorrectly operate relay TB or TC.

When the dial is released, it rotates back to normal, sending out pulses which are repeated by relay A at A2 to the DB drive magnet: Positive, MK3 (FIG. 11); STK2 (FIG. 1); W3 normal; ST3 operated; A2 normal; B4 operated; magnet DB25; negative. The DB wipers are advanced 1 to 10 steps according to the digit dialled. If the digit 0 is dialled, the wipers are advanced 10 steps.

When the dial restores to normal at the completion of the units digit the dial off-normal contacts DON open and release relay B (FIG. 1).

Contacts B1 complete a short-circuit on relay B, via B1 normal, C2 operated, W4 normal, to prevent the reoperation of relay B should the dial be operated again.

Normal contacts B2 and B3 (FIG. 2) connect positive via contacts C4, C5 operated; BR2 normal (FIG. 3) and LR2 normal (FIG. 3) in parallel; to the appropriate wiper DB1–5 (FIG. 2) according to which of the TA, TB, TC relays are operated, thus marking one of the 49 wires multipled to the banks such as BC1, 2 and LC1, 2 (FIGS 3, 4) of the five bothway uniselectors, e.g. BC, LC. Positive via B2, B3 normal (FIG. 2); C4, C5, operated, passes in parallel via BS1 normal (FIG. 3), and LS1 normal (FIG. 4) and interrupter contacts BCdm, LCdm, respectively, to operate relays BP, LP. Operated contacts BP1, LP1, close the circuits of switch magnets BC(F), LC(F).

Normal contacts B4 (FIG. 1) prepare a circuit via C3 operated, and via FIG. 2, to all the Dial keys, FIGS. 3, 4, in series, for dialling "Add" or "Subtract" pulses to a selected bothway uniselector, as described below. The closure of contacts B5 (FIG. 13) has no effect at this stage.

The 5 bothway uniselectors, such as BC, LC, each has associated with it the magnet pulsing relay BP, LP, (FIGS. 3, 4); a quick-to-operate stopping relay, e.g. BS, LS, each with its associated relief relay BR, LR, and a marking relay, e.g. BM (FIG. 14) LM (FIG. 17). Each of the five circuit groups operates in the same manner, and for this reason only the first and last of these groups are shown.

For simplicity in describing the circuit operation only the first group will be described in detail.

It should be borne in mind that in the initial setting operation all five bothway uniselectors will be hunting for the same marked position at the same time. They will each step independently at about the same speed, but may have varying numbers of steps to take, depending on the position on which the wipers were left after the previous programme.

The bothway uniselectors BC, LC, unlike the single way uniselector DB, can move their wipers either backwards or forwards on the operation of the relevant one of two driving magnets, e.g. BC(F), BC(B), (FIG. 3). The forward and backward driving magnets are indicated in the drawing by the letters F and B respectively in parentheses, e.g. BC(F), BC(B). The forward driving magnets are used for the initial setting operation.

Closure of the contacts B2 and B3 (FIG. 2) completed the circuit to the magnet pulsing relays BP, LP (FIGS. 3, 4) which operate simultaneously.

Considering the first circuit group, the operation of relay BP (FIG. 3) energizes via its single contact BP1, the forward drive magnet BC(F), which attracts its armature. The magnet armature carries a pawl which is moved forward by the attraction of the armature to step forward a ratchet wheel carried by the wiper assembly, so that the ratchet advances all the BC wipers to their next contacts. The movement of the armature also opens the interrupter contacts BCdm. Opening the interrupter contacts de-energizing relay BP, which in turn de-energizes the drive magnet, allowing the armature to restore. The armature pawl slips back into the next tooth on the ratchet wheel in readiness to step the ratchet and the wipers forward another step next time the armature is attracted. The interrupter contacts BCdm reclose, re-operating relay BP.

This interaction between the magnet pulsing relay e.g. BP, and the associated selector magnet, e.g. BC(F) is repeated advancing the selector wipers a step at a time. The switch steps on until wiper BC1 or BC2 (FIG. 3) steps on to the contact to which is connected the multiple wire from that one of the arcs DB1-5 (FIGS. 2, 8) to which positive potential is connected via B2, B3 normal, and C4, C5 operated (FIG. 2); BR2, LR2 normal (FIGS. 3, 4) and contacts of TA, TB, TC. A circuit is now completed via BR1 normal to the right-hand winding of the quick-to-operate stopping relay BS (FIG. 3).

Contacts BS1 change over to disconnect the circuit to relay BP, thus preventing further stepping, and to close a circuit for relay BR in series with the left hand holding winding of BS. Relay BR operates.

Contacts BR1 disconnect the initial operating circuit from relay BS and prepare a circuit for the operation of the pump selection relays via the BC switch wipers BC1, BC2.

Contacts BR (FIG. 3) in conjunction with the similar contacts, e.g. LR2 (FIG. 4) of the other circuit groups, open and disconnect the positive marking potential via B2, B3 normal (FIG. 2), from the DB1-5 arcs to the 49-wire multiple. It should be noted that as the BR2, LR2 contacts are in parallel, the marking positive is not finally disconnected until the last of the five relays, which include BR, LR, operates, and all the switches have been set.

The change-over of contacts BR3 (FIG. 14) transfer the control of the "tens" lamp circuit from contacts of TA, TB, TC (FIG. 14), to arcs BC7/8, and operated contacts BR5 and BR6. Every "tens" lamp is multiplied to the corresponding set of ten contacts in the 50-point bank BC7/8. All selected tens lamps are lit as follows: 12V.R., FIG. 14, connected to the lower terminals of lamps, FIGS. 14-17, bank contacts and wipers BC7-10; LC7-10; BR3, BR4 and LR3 operated, FIGS. 14, 15, 16; MK5 normal, FIG. 17; 12V.F.

Front contacts BR4 (FIG. 15) light the units lamps via arcs BC9/10, in which corresponding contacts, e.g. contact 1, in each set of 10, are multipled to the same units lamp operating lead, as indicated by the brackets adjacent the arcs.

In the other circuit groups, contacts of LR, for example, corresponding to the back contact of BR3 (FIG. 14) are not required and are not wired, since only the tens lamps on the BC banks are alternatively controlled by relays TA, TB, TC.

It is possible for the wipers BC7, BC8, to span two bank contacts momentarily during rotation. Since one of lamps 1-5, FIG. 14, is already lighted via a combination of TA, TB, TC contacts, spanning of contacts 11, 12 in BC7, or contacts 6, 7 in BC8, might cause two lamps to flash together. For this reason, normally open contacts BR5, BR6, are inserted in the lamp leads from the contact banks BC7, BC8, to prevent double flashing during rotation of switch BC. No other set of lamps has two parallel sets of controls.

When all five bothway uniselectors have lined up with the basic code and their associated relays, e.g. BR, LR have operated, the basic setting is displayed on each of the 5 pairs of digital indicators, of which two are shown in FIGS. 14, 15, 16, 17.

The setting of any of the five selectors may now be either increased or decreased as desired by setting the desired one of the dial keys, e.g. FIGS. 3, 4, to "Add," or "Subtract," and by dialling the required change.

As normally set, the change-over contact sets of each dial key make a series connection through all the keys without a connection to any one of the associated circuits. By throwing any one key to ADD or SUBTRACT the corresponding magnet, e.g. BC(B) (FIG. 3), is connected via FIG. 2, to FIG. 1, C3 operated, B4 normal, ST3 operated, W3 normal, to the dial impulse springs PC. At the same time, the series dial key circuit is broken. By operating the dial one or more times in succession, the selected magnet is impulsed successively to step the corresponding switch forwards or backwards by the required amount. The changed setting is immediately displayed on the relevant lamp indicator.

This operation can be carried out on only one selector at a time. It may be carried out repeatedly, changing the setting by any number up to 10 at each operation of the dial. The setting of several selectors can, of course, be changed one after the other by throwing and restoring the relevant keys in turn, and by dialling each switch while its magnet is in circuit.

When the required programme is set up on the five selectors, the equipment is ready for operation with the press. When the press is started up, a signal from the main control circuit closes contacts IC (FIG. 14) to operate relay BM (FIG. 14); negative; BM; IC; ST5 operated; lead via FIGS. 14, 15, 16, 17, normally-closed contacts of SET key SKL, FIG. 17; lead via FIGS. 17, 16, 15, 14, normally-closed contacts of SET key SKB, FIG. 14; manual key contacts MK4; W1, FIG. 14, normal; ST4 operated; positive. Relay BM (FIG. 14) holds via its front contacts BM1 (FIG. 15); normal contacts TM1, LM1, (FIGS. 16, 17), normally-closed lower contacts of limit switches LS123, LS122, FIGS. 17, 16, lead via FIGS. 15, 14, operated contacts ST5, to positive as above. Operated contacts BM2 (FIG. 15) light a pair of lamps shown for convenience together, but mounted on the lamp panel one to the left of the tens lamps shown in FIG. 14, and the other to the right of the units lamps shown in FIG. 15. The purpose of these lamps is to show which control stage, that is, which uniselector, is currently controlling the pump operating relays, and therefore controlling the speed of operation of the ram.

Figure 9:
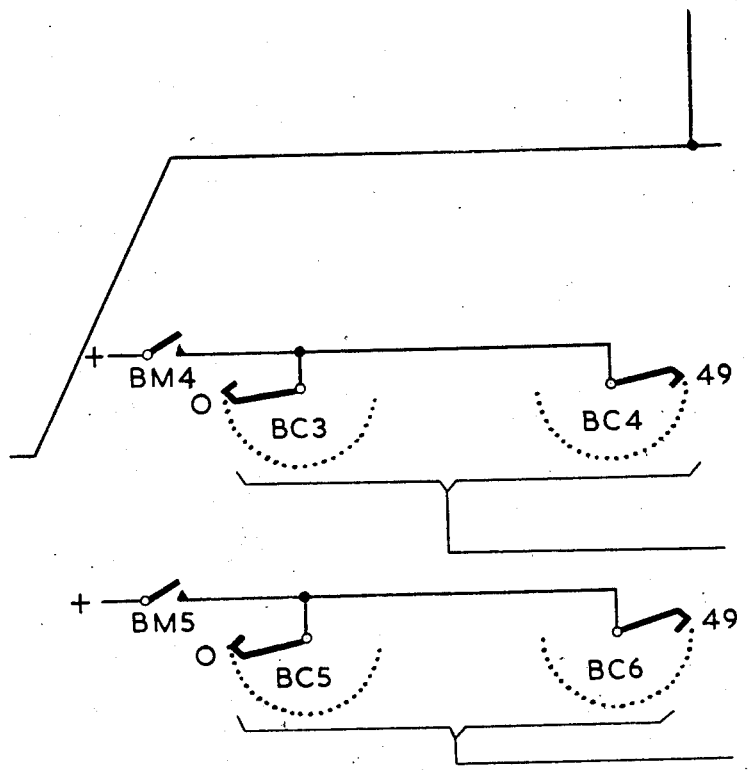

Positive potential via operated contacts BM3, BR1, FIG. 3; and BM4, BM5, FIG. 9; passes via the pairs of selector wipers BC1/2, BC3/4, and BC5/6 respectively to operate the appropriate combination of relays in the groups GC, GA, GB, HB, FIG. 6; DA, EA, FA, FIG. 12; AA, BA, CA, FIG. 19. Each of these relays will operate when any one of its four windings is energized. Contacts of these relays shown in FIG. 7 form the connecting link between the control circuits, which operate to 50 volts and nine pump relays (not shown) which are operable via the respective nine leads 1-9 FIG. 7, from a 220 volt A.C. supply controlled by contacts CR1 of a relay CR, FIG. 6. Relay CR is operable when any one of the five stage relays, such as BM, LM, FIGS. 14, 17, is operated, via operated contacts such as BM6, or LM6.

The sets of marking wires between the switch contact banks, such as BC1/2, 3/4, 5/6; LC1/2, 3/4, 5/6, of the five stages, and the windings of the four-winding relays AA-HB, are indicated by common leads bracketed at each end to indicate arrays of marking wires according to the pump combinations to be rendered operative in response to the various settings of the switches. The detailed marking arrangements are a matter of detailed design for individual presses according to techniques well known in the telephone switching and allied arts, but those shown are described below.

The switch banks BC1/2, LC1/2, FIGS. 3, 4 are used to indicate a 12-wire multiple between the stage switches BC, LC, and the first group of relays, FIG. 6, via FIG. 5. Since banks BC1/2, LC1/2 are also used for setting the switches BC, LC by means of the 49-wire multiple from the banks of switch DB, the 12-wire multiple would in practice probably utilise separate banks of BC, LC.

The twelve wires of the multiple will each be individually connected at one end to one of the relay windings, and at the other end in parallel to each of a number of contacts on each of the switch banks concerned. If it were desired to operate two relays from one bank position, two multiple wires would be connected to the bank contact concerned, or to corresponding contacts in two separate banks, if available. It is desirable to avoid interconnection of multiple wires, since this can lead to undesired operations, and it is for this reason that the relays each have, in the particular arrangement shown, four separate windings. The number of relay windings and the number of marking banks on the switches will be selected to avoid difficulties.

Figure 10:
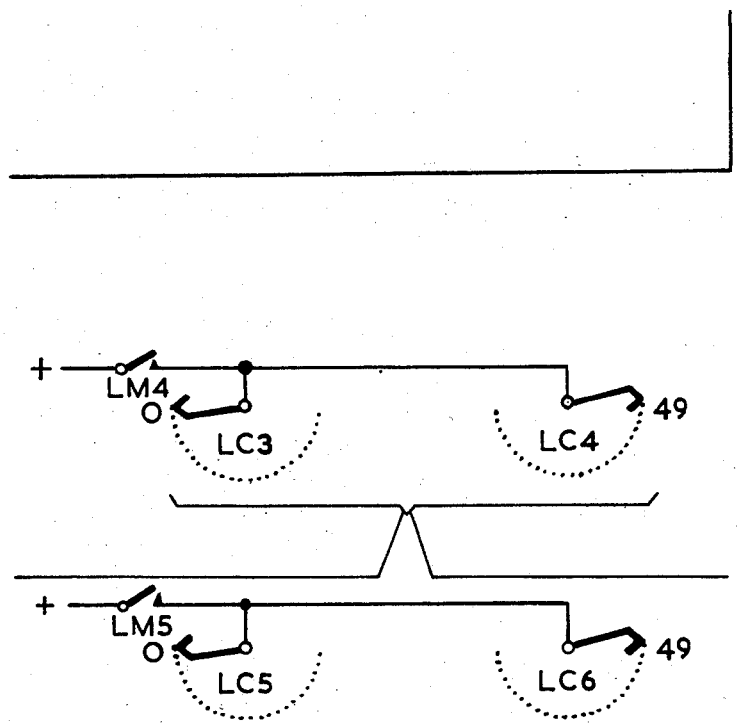

The other two multiples from banks BC3/4, BC5/6, LC3/4, LC5/6, FIGS. 9, 10 comprise seven wires each, and some of the wires are multipled in FIGS. 12 and 19 to windings on more than one of the relays DA-FA. Twelve wires could have been used. The choice of the size of the multiple and the interconnections via the multiple between switch and relays are a matter of choice by the designer bearing in mind economy and accuracy. The result to be obtained is to operate a unique relay combination for each of the 49 (or other) settings of a control.

Contacts BM6, (FIG. 6), operate relay CR, FIG. 6, which, via contacts CR1, FIG. 7, completes the circuit from one terminal of a 220 v., A.C. supply via an operated combination of contacts of relays AA-HB to a selected combination of the pump relays via the corresponding pump control leads 1-9, and terminating in the other 220 v., A.C. terminal. It will be noted that CR, FIG. 6, is operated by any one of the five contacts BM6-LM6, FIG. 6, so that its contacts CR1, FIG. 7, are operated at each stage of operation of the circuit.

The pressing stem body, FIG. 21, carries the movable contact 23 of a multi-position limit switch having spaced fixed contacts LS120-123, some of which are shown in FIGS. 16, 17. When the ram moves forward, the movable contact 23 makes contact in turn with the fixed contacts LS120-123. In the same way, a movable contact 24 carried by the piercer gear cooperates with another set of fixed contacts along which the movable contact passes when the mandrel is moved forward. The piercer gear contacts would cooperate with a separate set of control gear duplicating that shown in FIGS. 1-19 and separately operated.

As the cycle of operation of the press proceeds the ram limit switches, shown for explanatory purposes at LS122, LS123, FIGS. 16, 17, operate and release in turn working from left to right. The operation of a limit switch operates an associated marking relay, of which TM, LM, FIGS. 16, 17, are shown.

It will be remembered that relay BM, FIG. 14, operated in response to momentary operation of starter contacts IC, and locked via BM1 operated, FIG. 15; TM1 normal, FIG. 16; LM1 normal, FIG. 17; the limit switches LS123, 122, FIGS. 17, 16, normal; and so on, to positive. When limit switch LS122, FIG. 16, operates, its movable contact pin rises from its lower pair of contacts to close its upper pair of contacts. This change-over connects the relay TM to the said circuit to positive, and disconnects the locking circuit of relay BM, which releases. Relay TM operates. When the limit switch LS122, is released by further movement of the ram, the operating circuit for TM is opened, but TM locks via TM1 operated and via LS122 back to normal. When, in turn, LS123 is operated, relay LM, FIG. 17, is similarly operated and TM is released. An indicator, such as TIN (FIG. 16) or LIN (FIG. 17) is operated, to indicate which limit switch is in operation. Relay LM belongs to the same stage as switch LC, and its contacts LM1, 2; LM3; LM4, 5; are on FIGS. 17, 4, and 10 respectively. The operation of a relay in this series releases the locking circuit of the previously operated relay in the series and locks itself; e.g. the locking circuit of BM, FIG. 14 via BM1 operated, FIG. 15 and TM1 normal, LM1 normal, will be opened by the operation of relay TM which changes over TM1, FIG. 16, to release BM and to lock itself operated.

Release of BM, opens the marking circuits for pump control relays AA-HB via the contact banks of the corresponding marker switch BC, by opening BM3, FIG. 3; BM4, 5, FIG. 9, and completes marking circuits via TM contacts (not shown) to complete marking circuits via an associated control switch. When LM is in turn operated and releases TM, its contacts will complete marking circuits at LM3, 4, 5, FIGS. 4 and 10, to put the pump control relays under control of the associated selector LC as described above.

At the commencement of the next cycle of operation of the press, relay BM is operated releasing relay LM which is the last in the series.

Operation of any single one of the five press keys designated "Set" e.g. SKB, SKL, FIGS. 14, 17, operate the corresponding marking relay, e.g. BM, LM, releasing the previously-operated relay in the same manner as the limit switches: the circuit in question is from positive; ST4 operated, FIG. 13, W1 normal; Manual key MK4 normal, FIG. 4, and normal contacts of all the SET keys in series up to the operated key, e.g. SKL, FIG. 17, and via the operated key, and for example, LM, FIG. 17, to negative battery. Again, the corresponding indicator, such as LIN is operated.

By operating one of the marking relays from its SET key, the setting of the corresponding control switch is applied to the relay groups, FIGS. 6, 12, 19, in the same way as for operation of a marking relay by a limit switch. The relay groups will apply their new setting to the pump relays to modify the ram speed.

When the Start key is restored, relay A, FIG. 1 is released by the opening of the key contacts STK2. Key contacts STK1 open the locking circuit of relay ST, while contacts A1 open its initial operating circuit: in consequence, relay ST releases. Contacts ST2 return to their normal position and open the locking circuit of relay C which releases. A circuit is also closed for stepping magnet DB25 of switch DB via DB*dm*, FIG. 1, ST2 normal, multipled off-normal bank contacts and wiper DB8, to step uniselector DB to the home position at which the homing circuit is disconnected, since the home contact of DB8 is not included in the multiple wiring of its bank to ST2.

Figure 13:
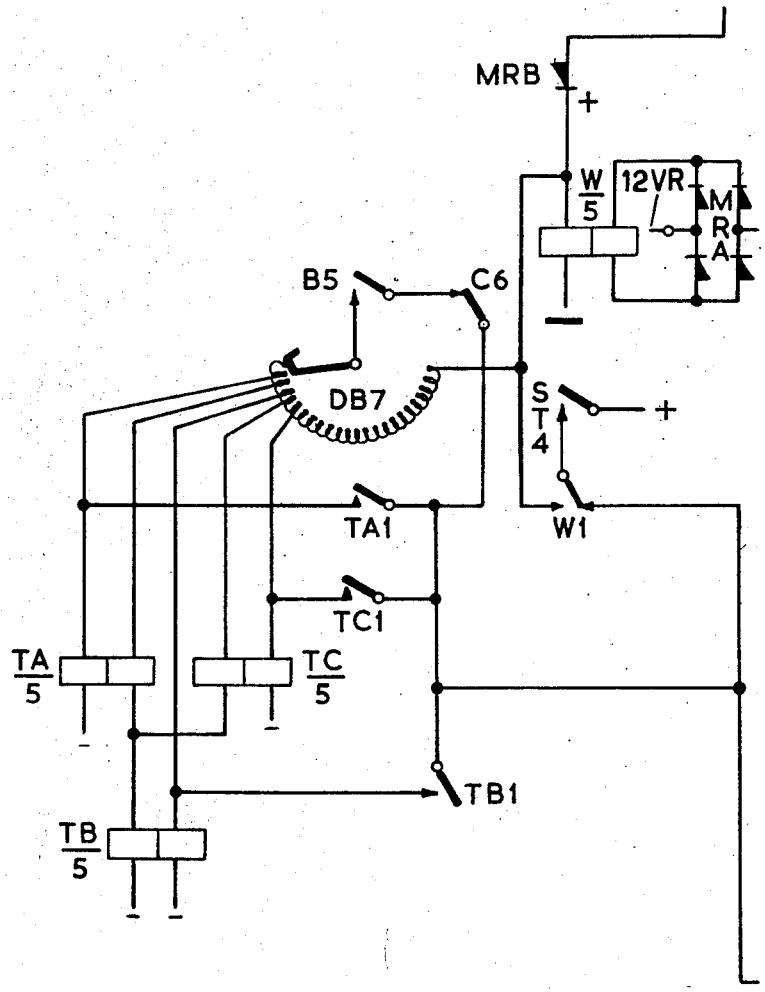

Contacts ST4, FIG. 13, open and release the operated relays in the TA, TB, TC, relay group, which have been locked operated via their front contacts, W1 normal, ST4 operated.

Contacts ST5, FIG. 14, open, to disconnect the circuit via the SET keys and the limit switches for the control relays, and so release the operated marking relay, e.g. BM, which in turn releases relays in the group AA–HB and relay CR.

Relay C releasing, opens contacts C4 and C5, FIG. 2, so that any operated relays such as BS, BR, LS, LR (FIGS. 3, 4) are released. The circuit is now fully restored to the unoperated condition, although the control switches BC, LC, are not homed, but remain in their set positions.

In the event of an unused code being dialled, relay W, FIG. 13, will be operated as described below, and will lock via its operated contacts W1 to ST4 operated. Operated contacts W2, FIG. 14, will light the Warning lamp WGL, FIG. 14, on the control panel. Contacts W3, FIG. 1, open the dialling circuit; and contacts W4, FIG. 1, open the circuit of relay B, thus preventing further operation. Relay W is released when the Start key is restored, releasing relay ST as described above.

The conditions under which relay W is operated are:

If the first digit dialled, that is the "tens" digit, is 6, 7, 8, 9, or 0 switch DB will be in one of its positions 6–10 and relay W will be operated via the commoning on contacts 6–24 of arc DB7, FIG. 13, wiper DB7, operated contacts B5, normal contacts C6, W1, operated contacts ST4, positive. The stepping circuit will, of course, be opened when one end of the DB7 wiper steps off the bank contact 25 and the other end of the double-ended wiper DB7 steps on to bank contact 1.

The switch DB is set in turn by the tens and units digits. In response to the tens digit, the switch will take 1, 2, 3, 4 or 5 steps. The switch banks DB1–DB5 are respectively allocated for marking purposes when the switch has responded to digits 1–5 respectively. In consequence, so far as bank DB1 is concerned, the wiper will be on contact 1 at the end of the tens digit, and will step to one of contacts 2–10 in response to the units digits. Contacts 2–10 of bank DB1 therefore indicate dialling of numbers 11–19.

Similarly, bank DB2 is allocated to tens digit 2, and its contacts 3–12 will indicate dialling of numbers 21–20. Banks DB3–5 are respectively allocated to the number groups 31–30 (bank contacts 4–13); 41–40 (bank contacts 5–14); 51–50 (bank contacts 6–15).

According to which tens digit 1–5 is dialled, the relays TA, TB, TC will be selectively operated to connect positive via B2, 3 normal, FIG. 2; C4, 5 operated, FIG. 2; BR2 normal, FIG. 3, to the corresponding one of wipers DB1–5, FIGS. 2, 8.

If the switch DB finishes up at the end of the dialling, with the selected one of wipers DB1–5 on any contact beyond the respective group specified above, or is still on the corresponding tens digit contact, then the wiper will be in contact with the multiple wiring on its bank, which is connected to relay W (FIG. 13) via a rectifier MRB. Relay W therefore operates.

If when dialling on to a bothway uniselector BC, LC, "Adding" or "Subtracting" pulses are sent such that the code would be made greater than 59 or less than 11, relay W (FIG. 13) operates when the selector steps on to position "0." In this case, relay W operates on its right hand 12-volt winding to current derived by a full wave rectifier MRA (FIG. 13), which is activated by the 12 volt A.C. lamp feed which is connected between 12VR connected to one point of MRA, and 12VF, FIG. 17, which is connected via MK5, via FIGS. 16, 15, 14, operated contacts, e.g. BR3, selector wiper 7 (e.g. BC7, FIG. 14) and bank contact 0 connected to the opposite point of MRA, FIG. 13.

The relays in the group AA–HB and CR controlling the pump relays may be operated under manual control by throwing the Manual key MK to close its contact MK1, 2, 3, 4, 5, 6 and 7, FIGS. 5, 6, 11, 14, 17 and 18; and by manually setting the rotary switch on the control panel, the wipers and contact banks MCS1, 2, 3 of which are shown in FIGS. 5, 11 and 18, to a desired position.

The rotary manual switch then fulfils the same function as any one of the control switches such as BC, LC, in operating a combination of the relays AA–HB via the same marking multiples that are used by the control switches. Positive potential is connected to the wipers MCS1, 2, 3, FIGS. 5, 11, 18, by the manual key contacts MK1, MK3, MK6. Manual key contacts MK2, FIG. 6, operate relay CR direct, to activate the pump control circuit, FIG. 7.

Contacts MK4 (FIG. 14) open the main marker control circuit for relays BM, TM, LM, which is not required during manual control, while manual key contacts MK5 open the lamp indicator circuits which have no function during manual switch control.

While I have illustrated and described in detail various control circuits, particularly for controlling the operation of extrusion presses for the extrusion of metal billets, it will be understood that various changes in circuitry and other modifications may be made within the skill of persons skilled in the art without departing from the spirit of my invention or the scope of the following claims.

I claim:

1. A metal extrusion press comprising a main ram, hydraulic means for driving said ram, a plurality of control devices regulating the supply of liquid to the hydraulic means, the speed of the ram being variable by the use of different combinations of said control devices, and electrical control equipment comprising a plurality of stage switches, switch-operating means movable together with the ram and arranged to operate said stage switches in turn during a cycle of the press, and selector means operating different groups of said control devices in response to actuation of different stage switches by said switch-operating means, said electrical control equipment further comprising multi-position switches each providing a number of control paths at each position, for controlling the operation of each of said control devices, and interconnections between each position of each said multi-position switch and said control devices, whereby different combinations of said control devices are rendered operative via different positions of each of said multi-position switches and whereby the speed of the ram is varied in a pre-determined sequence during the cycle of the press.

2. A press as claimed in claim 1, and comprising manual control means for setting said multi-position switches, said manual control means being so arranged that successive operations of said manual control means are automatically directed to successive multi-position switches to set the switches in accordance with a required operational sequence for the speed of the ram.

3. A press as claimed in claim 2 wherein said multi-position switches are operable in both forward and reverse directions and comprising manually-operable direction-selecting switches for determining the direction in which a multi-position switch will move in response to instructions from said manual control means.

4. A metal extrusion press comprising a main ram, hydraulic means for driving said ram, a plurality of control devices each operable to supply liquid at a predetermined rate to said hydraulic means whereby the speed of the ram is variable by the use of different combinations of said control devices, and electrical control equipment comprising a digital electrical impulse sender and electrical switching equipment arranged to operate a selected combination of said control devices in response to signals from the impulse sender.

5. A press having a ram and hydraulic means for driving said ram, speed control means acting on said hydraulic means, whereby one of a series of different speeds can be imposed on said ram, electrical switching equipment comprising a plurality of stage switches placed along the path of said ram and operable in succession by the advance of said ram, multi-position selector switches for selecting any one of said different ram speeds, one multi-position selector switch being provided in respect of each stage switch, each position in a multi-position selector switch corresponding to a different speed, means for setting each multi-position selector switch at one of said speeds independently of all the other multi-position selector switches and means for placing each of said selector switches, after setting, in circuit with the stage switch and with the speed control means for the ram, so that any one speed of the series of different ram speeds can be allocated to any one stage switch in the path of the ram.

6. A metal extrusion press having a ram and hydraulic means for driving said ram, speed control means acting on said hydraulic means, whereby one of a series of different speeds can be imposed on said ram, electrical switching equipment comprising a plurality of stage switches placed along the path of said ram and operable in succession by the advance of said ram, a primary multi-position selector switch common to all stage switches for selecting a basic speed from said series of different ram speeds, a plurality of secondary multi-position selector switches, one for each stage switch, each position on said primary and secondary selector switches corresponding to a different one of said speeds, means for setting together said primary selector switch and all said secondary selector switches at one of said speeds, means for varying the setting of each one of said secondary selector switches independently of the other secondary selector switches and of the primary selector switch, and means for placing each of said secondary selector switches, after re-setting, in circuit with its stage switch and with the speed control means for said ram, so that any one speed of the series of different ram speeds can be allocated to any one stage switch in the path of the ram.

7. A metal extrusion press having a ram and hydraulic means for driving said ram, speed control means acting on said hydraulic means, whereby one of a series of different speeds can be imposed on said ram, electrical switching equipment comprising a plurality of stage switches placed along the path of said ram and operable in succession by the advance of said ram, a primary multi-position selector switch common to all stage switches for selecting a basic speed from said series of different ram speeds, a plurality of secondary multi-position selector switches, one for each stage switch, each position on said primary and secondary selector switches corresponding to a different one of said speeds, means for setting together said primary selector switch and all said secondary selector switches at one of said speeds, means for varying the setting of each one of said secondary selector switches independently of the other secondary selector switches and of the primary selector switch by moving a secondary selector switch in either direction, and means for placing each of said secondary selector switcthes, after re-setting, in circuit with its stage switch and with the speed control means for said ram, so that any one speed of the series of different ram speeds can be allocated to any one stage switch in the path of the ram.

8. A metal extrusion press having a ram and hydraulic means for driving said ram, speed control means acting on said hydraulic means whereby one of a series of different speeds can be imposed on said ram, electrical switching equipment comprising a plurality of stage switches placed along the path of said ram and operable in succession by the advance of said ram, a primary multi-position selector switch common to all stage switches for selecting a basic speed from said series of different ram speeds, a plurality of secondary multi-position selector switches, one for each stage switch, each position on said primary and secondary selector switches corresponding to a different one of said speeds, means for setting together said primary selector switch and all said secondary selector switches at one of said speeds, manually-operable direction-selecting switches for varying the setting of each one of said secondary selector switches independently of the other secondary selector switches and of the primary selector switch, and means for placing each of said secondary selector switches, after re-setting, in circuit with its stage switch and with the speed control means for said ram, so that any one speed of the series of different ram speeds can be allocated to any one stage switch in the path of the ram.

9. A metal extrusion press having a ram and hydraulic means for driving said ram, speed control means acting on said hydraulic means, whereby one of a series of different speeds can be imposed on said ram, electrical switching equipment comprising a plurality of stage switches placed along the path of said ram and operable in succession by the advance of said ram, multi-position selector switches for selecting any one of said different ram speeds, one multi-position selector switch being provided in respect of each stage switch, each position in a multi-position selector switch corresponding to a different speed, means for setting each multi-position selector switch at one of said speeds independently of all the other multi-position selector switches, means for placing each of said selector switches, after setting, in circuit with the stage switch and with the speed control means for the ram, so that any one speed of the series of different ram speeds can be allocated to any one stage switch in the path of the ram, a set of manual switches, and means for making said manual switches operable in place of said stage switches for the control of the circuits of said selector switches and speed control means.

10. A metal extrusion press having a ram and hydraulic means for driving said ram, speed control means acting on said hydraulic means, whereby one of a series of different speeds can be imposed on said ram, electrical switching equipment comprising a plurality of stage switches placed along the path of said ram and operable in succession by the advance of said ram, a primary multi-position selector switch common to all stage switches for selecting a basic speed from said series of different ram speeds, a plurality of secondary multi-position selector switches, one for each stage switch, each position on said primary and secondary selector switches corresponding to a different one of said speeds, means for setting together said primary selector switch and all said secondary selector switches at one of said speeds, means for varying the setting of each one of said secondary selector switches independently of the other secondary selector switches and of the primary selector switch, means for placing each of said secondary selector switches, after re-setting, in circuit with its stage switch and with the speed control means for said ram, so that any one speed of the series of different ram speeds can be allocated to any one stage switch in the path of the ram, a set of manual switches, and means for making said manual switches operable in place of said stage switches for the control of the circuits of said selector switches and speed control means.

References Cited by the Examiner

UNITED STATES PATENTS

| | | | |
|---|---|---|---|
| 2,366,417 | 1/45 | MacMillin | 207—1.3 |
| 2,387,532 | 10/45 | Schenk | 207—1.3 |
| 2,596,988 | 5/52 | Katz | 207—1.3 |
| 2,710,934 | 6/55 | Senn | 90—13.99 |
| 2,748,665 | 6/56 | Senn | 90—13.99 |
| 2,775,015 | 12/56 | Erb | 207—1.3 |
| 2,814,007 | 11/57 | Lesher et al. | 82—2.2 |
| 2,859,290 | 11/58 | Grinage | 82—2.2 |

MICHAEL V. BRINDISI, *Primary Examiner.*

CHARLES W. LANHAM, RICHARD H. EANES,
*Examiners.*